(12) United States Patent
Koseski et al.

(10) Patent No.: US 8,959,954 B2
(45) Date of Patent: Feb. 24, 2015

(54) PROPPANTS FROM MINERALOGICAL MATERIAL

(71) Applicant: The Penn State Research Foundation, University Park, PA (US)

(72) Inventors: Ryan P. Koseski, State College, PA (US); John R. Hellmann, State College, PA (US); Barry E. Scheetz, Lemont, PA (US)

(73) Assignee: The Penn State Research Foundation, University Park, PA (US)

( * ) Notice: Subject to any disclaimer, the term of this patent is extended or adjusted under 35 U.S.C. 154(b) by 211 days.

(21) Appl. No.: 13/743,488

(22) Filed: Jan. 17, 2013

(65) Prior Publication Data

US 2013/0125586 A1    May 23, 2013

Related U.S. Application Data

(63) Continuation-in-part of application No. 12/534,548, filed on Aug. 3, 2009, now Pat. No. 8,359,886.

(60) Provisional application No. 61/097,734, filed on Sep. 17, 2008.

(51) Int. Cl.
| | |
|---|---|
| *C03C 10/10* | (2006.01) |
| *C03C 1/00* | (2006.01) |
| *C03C 12/00* | (2006.01) |
| *C03B 19/10* | (2006.01) |
| *C09K 8/80* | (2006.01) |
| *C03C 1/02* | (2006.01) |
| *C03C 10/00* | (2006.01) |

(52) U.S. Cl.
CPC ............... *C03C 1/002* (2013.01); *C03C 12/00* (2013.01); *C03B 19/102* (2013.01); *C03B 19/1095* (2013.01); *C09K 8/80* (2013.01); *C03C 1/026* (2013.01); *C03C 10/00* (2013.01)
USPC ............................................ 65/33.7; 65/33.1

(58) Field of Classification Search
USPC .................................................. 65/33.1, 33.7
See application file for complete search history.

(56) References Cited

U.S. PATENT DOCUMENTS

| | | | |
|---|---|---|---|
| 3,030,215 | A | 4/1962 | Veatch et al. |
| 4,261,706 | A | 4/1981 | Blanding et al. |
| 4,395,271 | A | 7/1983 | Beall et al. |
| 5,964,911 | A | 10/1999 | Morano et al. |
| 5,981,413 | A | 11/1999 | Hale |
| 6,057,257 | A | 5/2000 | Morano et al. |
| 7,175,786 | B2 | 2/2007 | Celikkaya et al. |
| 7,648,934 | B2 | 1/2010 | Shmotev et al. |
| 2004/0050098 | A1 | 3/2004 | Ball et al. |
| 2004/0148967 | A1 | 8/2004 | Celikkaya et al. |
| 2009/0082231 | A1 | 3/2009 | Shmotiev et al. |
| 2009/0192059 | A1 | 7/2009 | Shmotev et al. |
| 2009/0288820 | A1 | 11/2009 | Barron et al. |

FOREIGN PATENT DOCUMENTS

| | | |
|---|---|---|
| JP | 2003131358 A | 5/2003 |
| JP | 2006516523 A | 7/2006 |

OTHER PUBLICATIONS

PCT/US2009/057255, International Search Report, Apr. 15, 2010.

*Primary Examiner* — Joseph S Del Sole
*Assistant Examiner* — Russell Kemmerle, III
(74) *Attorney, Agent, or Firm* — Gifford, Krass, Sprinkle, Anderson & Citkowski, P.C.

(57) ABSTRACT

A process for producing proppants from waste mineralogical material. The process can include providing the waste mineralogical material in a form such as particles, fines, dust, powders, and the like, and forming a plurality of "green" pellets from the waste mineralogical material. Thereafter, the plurality of green pellets are fed into a provided flame drop tower that has a combustion flame, a hot zone, and a collection basin located downstream from the hot zone. The plurality of green pellets pass through the hot zone, are melted and subsequently solidified in the shape of a sphere downstream from the hot zone to form vitrified glass spheres. In some instances, the vitrified glass spheres are subjected to a devitrification step.

20 Claims, 2 Drawing Sheets

PROPPANTS FROM MINERALOGICAL MATERIAL

CROSS-REFERENCE TO RELATED APPLICATIONS

This application is a continuation-in-part of U.S. patent application Ser. No. 12/534,548 filed on Aug. 3, 2009, which claims priority to U.S. Provisional Application No. 61/097,734, filed Sep. 17, 2008, which is incorporated herein in its entirety by reference.

FIELD OF THE INVENTION

The present invention is related to a process for producing proppants from a mineralogical material, and in particular to producing proppants from a waste mineralogical material.

BACKGROUND OF THE INVENTION

Hydrofracturing, also known as "hydrofracing", "hydraulic fracturing", and/or "fracting", involves pumping a mixture of water and proppants into a section of a geological formation with sufficient pressure to crack and/or open natural fractures within the formation. The proppants are used to "prop" open the cracks and/or natural fractures so that pressure from the geological formation does not close the cracks and/or fractures and reduce or shut off, for example natural gas, from the formation.

High quality proppants, for example spherical shaped proppants from high grade Brady and Ottawa sands or sintered aluminosilicates obtained from high purity grade bauxite and kaolin, can afford up to 30 to 50 percent more oil and/or gas from a geological formation compared to the use of low grade proppants or no proppants at all. However, high grade Brady and Ottawa sands are being depleted and the majority of bauxite deposits are located in China, thereby having a significant shipping cost associated therewith when used in the United States.

In addition to the above, discovery of an estimated 500 trillion cubic feet of natural gas within the Marcellus Shale in 2008 has further increased the potential demand for proppants that can be used for natural gas drilling that employs hydrofracing. Therefore, a process that provides a cost-effective proppant from readily available material would be desirable.

SUMMARY OF THE INVENTION

The present invention provides a process for producing proppants from waste mineralogical material that is typically disposed of, for example in landfills. The process includes providing the waste mineralogical material in a form such as particles, dust, powders, and the like, and forming a plurality of "green" pellets from the waste mineralogical material. Thereafter, the plurality of green pellets are fed into a flame drop tower that has a combustion flame, a hot zone, and a collection basin located downstream from the hot zone. The plurality of green pellets pass through the hot zone, are melted and subsequently solidified in the shape of a sphere downstream from the hot zone and before reaching the collection basin.

In some instances, the waste mineralogical material is metabasalt waste from a metabasalt mine. In some instances, the metabasalt waste can be in the form of a dry powder having an average particle size of less than 150 microns, for example less than 50 microns. The metabasalt waste can be mixed with a component such as water, starch, polyvinyl alcohol, and the like and formed into a plurality of green pellets that have an average pellet size of between 150 to 1000 microns.

The plurality of green pellets can have a water content of between 15 to 25 weight percent, which can benefit from a drying process or step to reduce the water content to between 0.5 to 1 weight percent before the green pellets are fed into the flame drop tower.

In some instances, the plurality of the green pellets can be preheated before feeding into the flame drop tower. For example and for illustrative purposes only, the green pellets can be preheated to a temperature of between 100 to 400° C. and thereby reduce the amount of thermal shock experienced by the green pellets upon entering the hot zone. The process can also include the use of waste heat from the flame drop tower to dry the plurality of green pellets, preheat the plurality of green pellets and the like such that energy consumption of the process is reduced.

The hot zone of the flame drop temperature can have a temperature between 1300 to 1500° C., and with a residence time of between 0.5 to 1.5 seconds for the green pellets within the hot zone, the pellets can be completely melted. Upon exiting the hot zone, the green pellets solidify during a residence time of between 1 to 3 seconds between the hot zone and the collection basin. The solidified pellets can be in the form of spheres, e.g. vitrified glass spheres having a size range between 150 to 1700 microns. Thereafter, the vitrified glass spheres can be subjected to a devitrification step, for example heating of the vitrified glass spheres to a temperature of between 700 to 1050° C., inclusive. The vitrified glass spheres can have a fracture toughness of at least 25% greater that the vitrified glass spheres, and in some instances can have a Vickers indentation fracture resistance greater than 1.2 megapascals meter to the one-half power (MPa $\sqrt{m}$).

DETAILED DESCRIPTION OF THE PRESENT INVENTION

Figure 1:
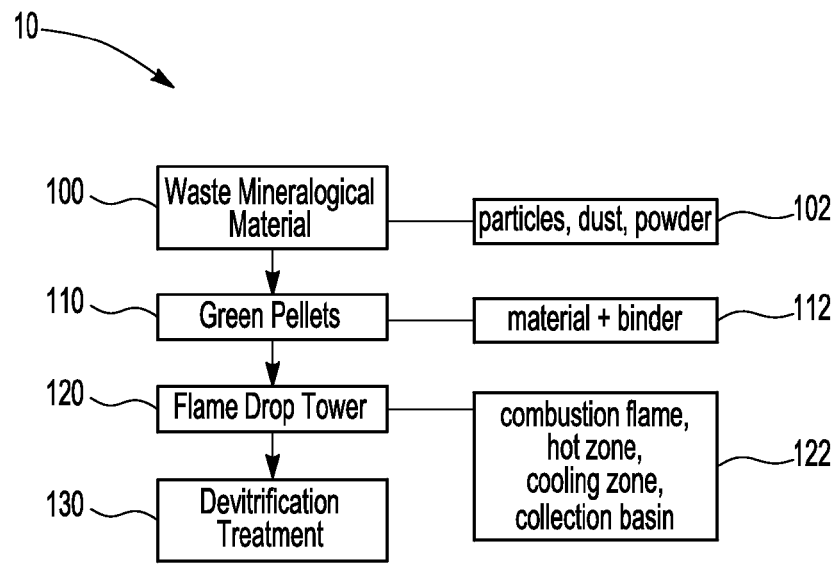
FIG. 1 is a schematic illustration of a process according to an embodiment of the present invention.

The present invention provides a process for producing proppants from waste mineralogical material. As such, the present invention has use as a process for producing material used in oil and/or natural gas drilling.

The process can include taking waste mineralogical material left from mining, disposed of or to be disposed of in landfills and the like. The mineralogical material and/or waste mineralogical material can include materials such as rhyolite, tholeiite, olivine, basalt, metabasalt, andesite, and the like. In addition, the waste mineralogical material can be fines, dust, etc. that have an average particle size of less than 150 microns, 100 microns, or 50 microns. In some instances, the waste mineralogical material can be processed to provide an average particle size of less than 150 microns, 100 microns, or 50 microns.

The particles of the waste material can be mixed with a component, for example water, starch, polyvinyl alcohol, and the like to produce "green" pellets using a dry pelletizing process. For the purposes of the present invention, the term "green pellets" is defined as an agglomeration of waste mineralogical material particulates for processing through a flame drop tower. Stated differently, the green pellets are pellets of the waste mineralogical material before the pellets have been melted and solidified in the flame drop tower. Any type of dry pelletizing process known to those skilled in the art can be used to produce the green pellets, for example the process described in U.S. Pat. No. 4,427,068 with the use of a K-LAB high intensity mixer manufactured by Lancaster Products located in Lebanon, Pa., that employs a rotating horizontal table and a high-speed impeller that operate in a countercurrent manner.

The green pellets can have an average pellet size of between 150 to 1000 microns and a water content between 1 to 30 weight percent, for example between 15 to 25 weight percent. A binder such as the starch and/or polyvinyl alcohol can be used during the mixing process to produce the green pellets, the starch and/or polyvinyl alcohol having a concentration range of from 0.1 to 5 weight percent of the dry powder.

The green pellets can be processed through a drying step to reduce the moisture content to less than 1%, for example less than 0.5%, using conventional drying equipment such as a fluid bed dryer. The dried green pellets can then be screened to remove any pellets having an undesirable size. In addition, the dried green pellets can be stored for later processing or fed directly into a flame drop tower—with or without having been first screened to remove pellets having an undesirable size.

In some instances, the dried green pellets can be subjected to a preheating step prior to being fed into the flame drop tower in order to reduce thermal shock to the pellets. For example and for illustrative purposes only, the green pellets can be heated to within an approximate temperature range of between 100 to 400° C.

The green pellets can be fed into the flame drop tower in a controlled manner. In addition, the flame drop tower can have one or more burners to produce a hot zone, sometimes called a melt zone, in which complete melting of the green pellets can occur and result in the production of homogeneous glass spheres. In some instances, the hot zone can have a temperature between 1300 to 1500° C. and the pellets can have a residence time within the hot zone from 0.5 to 1.5 seconds.

After passing through the hot zone, the green pellets can be in the form of molten particles that pass through a cooling zone where spheroidization and solidification can occur. In this manner, the molten particles can become uniformly spherical and exit the furnace as discretely fused glass particles. In some instances, the temperature range in the cooling zone can be between 1490 to 600° C. and the particles can have a residence time within the cooling zone from 1 to 3 seconds.

The fused glass particles can be collected in a collection basin that is located downstream from the hot zone. For example, the flame drop tower can be a vertical flame drop tower with a collection basin located at a lower portion or at the bottom of the vertical flame drop tower. However, it is appreciated that the collection basin does not have to be at the bottom of a vertical flame drop tower and can be any type of collection mechanism located downstream from the hot zone.

Upon exiting the furnace, the spherical fused glass particles can be classified by particle size, stored for packaging and/or shipment, and/or be subjected to secondary heat treatment that affords for devitrification thereof. The glass spheres can have a bulk specific gravity with reference to water of 1.65 to 1.80 and an apparent specific gravity with reference to water of between 2.6 to 2.8. In addition, the glass particles can have a smooth surface and a tailored density. Stated differently, based on variables such as flame luminosity, burner firing rates, oxygen fugacity, green pellet size, green pellet feed rate, and the like, spherical glass particulates of a desired size, shape and/or density can be produced.

Turning now to FIG. 1, a process for making proppants from a waste mineralogical material is shown generally at reference numeral 10. The process 10 include providing the waste mineralogical material at step 100, the material being in the form of particles, dust, and/or powder as indicated at reference numeral 102. The waste mineralogical material is then processed to form green pellets at step 110. In some instances, the green pellets are made by mixing the waste mineralogical material with a binder as illustrated at reference numeral 112. Thereafter, the green pellets are fed into a flame drop tower at step 120, the flame drop tower having at least one combustion flame, a hot zone, a cooling zone, and a collection basin as indicated at reference numeral 122. As stated above, an optional devitrification treatment can be performed at step 130.

Figure 2:
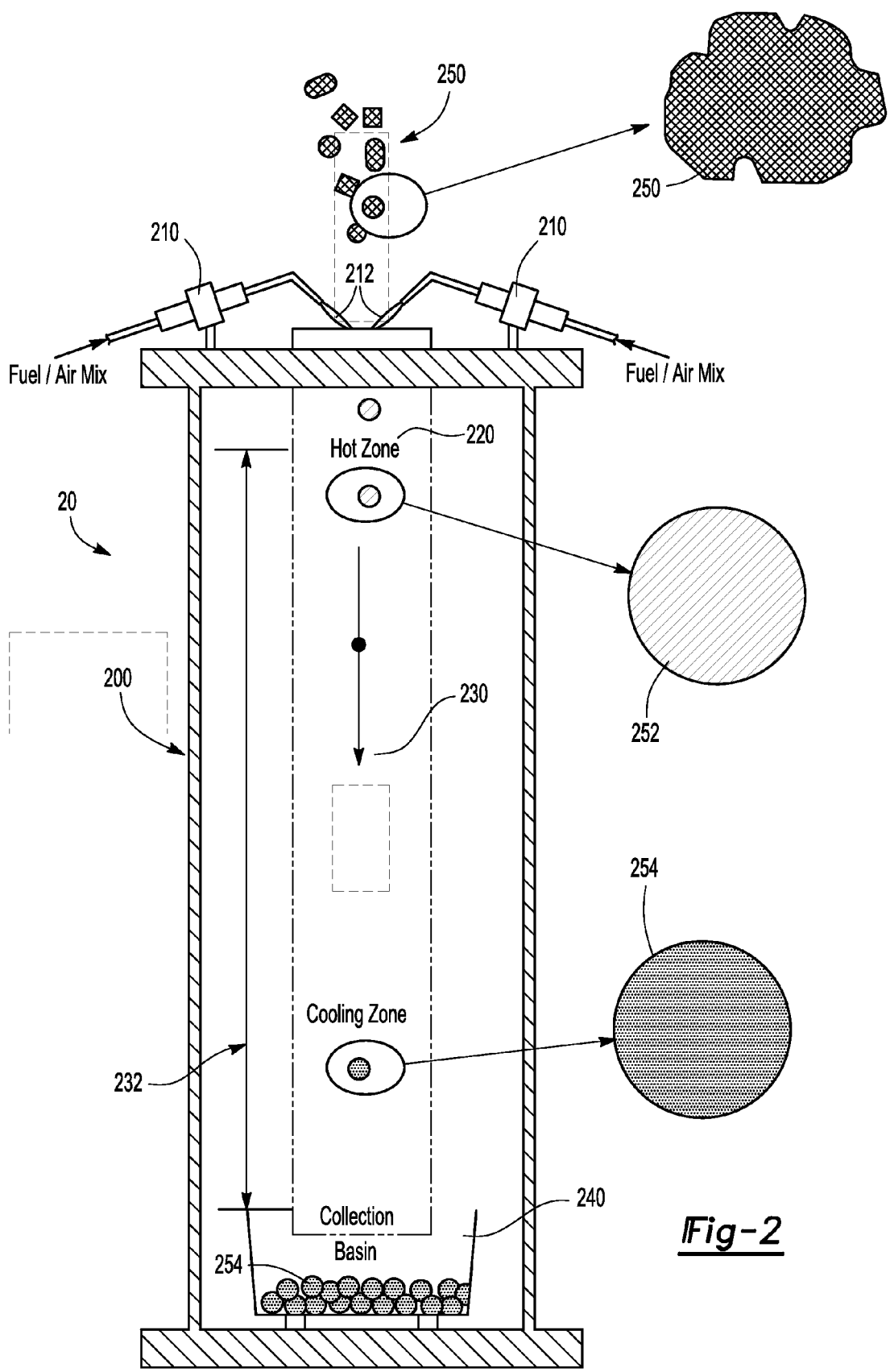
FIG. 2 is a schematic illustration of a flame drop tower that can be used in a process according to an embodiment of the present invention.

An illustrative example of a flame drop tower is shown generally at reference numeral 20 in FIG. 2. The flame drop tower 20 can include a column 200 with one or more torches 210 that produce a combustion flame 212. Below or downstream from the combustion flame 212, can be a hot zone 220 followed by a cooling zone 230 and a collection basin 240. A distance 232 between the hot zone and the collection basin can be adjusted such that a desired residence or falling time for material introduced into the hot zone and allowed to pass to the collection basin can be altered as desired.

As illustrated in FIG. 2, a plurality of green pellets 250 can be fed into an upper or top portion of the flame drop tower 20, allowed to pass through the hot zone 220, through the cooling zone 230 and into the collection basin 240. The green pellets 250 can have a generally rough and irregular surface as shown by the magnified view of a pellet 250. However upon passing through the hot zone 220, the green pellet 250 is completely melted to form a melted or liquid particle 252. Upon passing or falling through the cooling zone 230, the melted particle 252 solidifies to become a solidified particle 254. It is appreciated that a spherical shape is formed while the particle is completely liquid and/or as it cools and solidifies.

Figure 3:
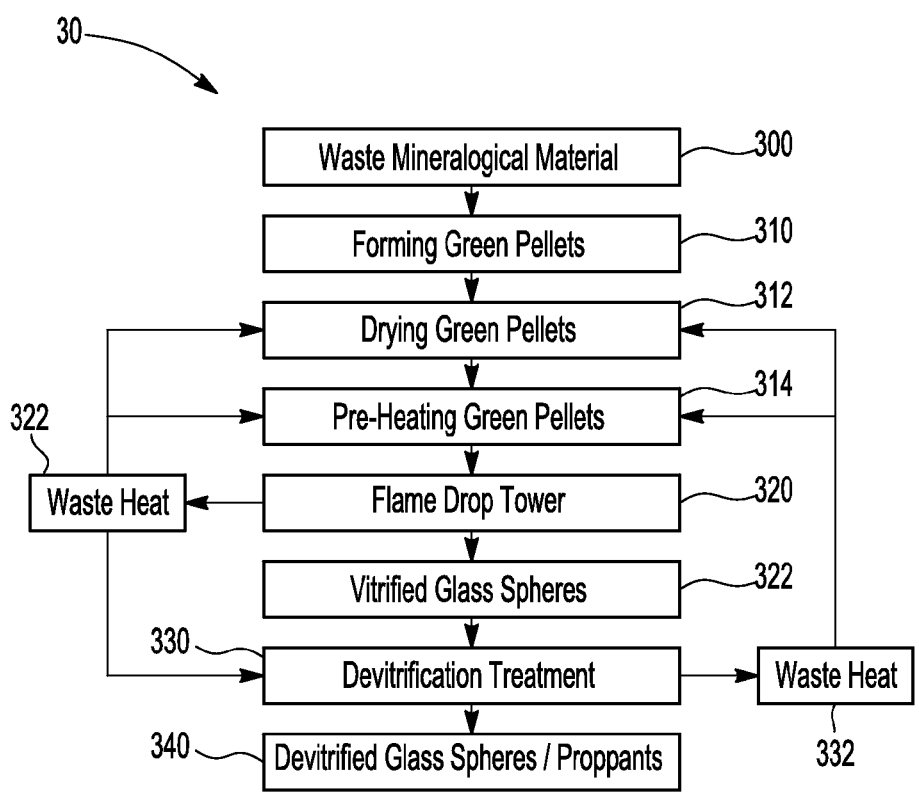
FIG. 3 is a schematic illustration of another process according to an embodiment of the present invention.

Referring now to FIG. 3, another process according to embodiment of the present invention is shown at reference numeral 30. The process 30 provides waste mineralogical material at step 300 and forms green pellets from the material at step 310. Thereafter, the green pellets are dried at step 312 and optionally preheated at step 314. The dried and/or preheated green pellets are fed to the flame drop tower at step 320 which affords for the production of vitrified glass spheres at step 322. An optional devitrification treatment can be performed at step 330 which can provide devitrified glass spheres/proppants at step 340. In addition to these steps, waste heat from the flame drop tower can be removed at step 322 and provided to steps 312, 314 and/or 330 in order to aid in the drying of the green pellets, preheating of the green pellets, and/or devitrification treatment of the vitrified glass spheres, respectively. Likewise, waste heat from the devitrification treatment at step 330 can be removed at step 332 and be used to aid in the drying of the green pellets at step 312 and/or preheating of the green pellets at step 314. In this manner, use of waste heat can reduce the overall amount of energy required for the production of devitrified glass spheres/proppants.

The devitrification treatment can include heating the vitrified glass spheres to a temperature of greater than 600° C. for a predetermined time. Thereafter, the glass sphere can be cooled to ambient temperature with the devitrification treatment altering the failure mechanism of the glass spheres from a very high energy failure that produces generally fine powder to a lower energy failure that produces generally large fragments. In some instances, the vitrified glass spheres can be heated to a temperature between 700 to 1050° C., inclusive, the heating step resulting in nucleation and growth of a crystalline phase, which may or may not be an iron oxide. In addition, the crystalline phase can provide a nucleation site for the growth of other phases which can alter the fracture toughness and morphology of the spherical particulate. For example and for illustrative purposes only, the devitrification treatment can produce a proppant that has a fracture toughness at least 10% greater than the vitrified glass spheres, i.e. the glass spheres before the devitrification treatment. In other instances, the fracture toughness of the glass spheres after the devitrification treatment can be at least 25% greater than the vitrified glass spheres, while in still other instances the fracture toughness can be at least 50% greater than vitrified glass spheres.

Quantitatively, the process can provide devitrified glass proppants that have a Vickers indentation fracture resistance (VIFR) greater than 1.2 MPa·m$^{1/2}$, with the VIFR determined by the expression VIFR=0.1706(H·$\sqrt{a}$)·Log(4.5a/c), where H is a Vickers hardness value of the glass particulate, A is a diagonal length of an indentation produced on a surface of the glass particulate from a Vickers hardness test, and C is a length of a crack extending from the indentation. In some instances, the VIFR for the proppant can be greater than 1.5 MPa·m$^{1/2}$ and in other instances greater than 1.8 MPa·m$^{1/2}$.

In view of the teaching presented herein, it is to be understood that numerous modifications and variations of the present invention will be readily apparent to those of skill in the art. For example, while the invention has primarily been described with reference to metabasalt, other mineralogical materials obtained from various mining operations can be used with adjustments to parameters such as flame luminosity, burner firing rates, oxygen fugacity, green pellet size, green pellet feed rate, and the like affording for proppants that are cost efficient, spherical, etc. As such, the foregoing is illustrative of specific embodiments of the invention, but is not meant to be a limitation upon the practice thereof. It is the following claims, including all equivalents, which define the scope of the invention.

We claim:

1. A process for producing proppants from waste mineralogical material, the process comprising:
   providing a waste mineralogical material in a form selected from at least one of particles, dust and powders;
   forming a plurality of green pellets from the waste mineralogical material;
   providing a flame drop tower having a combustion flame and a hot zone proximate an upper portion of the flame drop tower and a collection basin located downstream the hot zone;
   feeding the plurality of green pellets into the flame drop tower, the plurality of green pellets passing through the hot zone, melting and solidifying in the shape of a sphere downstream of the hot zone and before reaching the collection basin.

2. The process of claim 1, wherein the waste mineralogical material is metabasalt waste from a metabasalt mine.

3. The process of claim 2, wherein the metabasalt waste is mixed with a component selected from at least one of water, starch and polyvinyl alcohol to form the plurality of green pellets.

4. The process of claim 3, wherein the metabasalt waste is in the form of a dry powder having an average particle size of less than 150 microns.

5. The process of claim 4, wherein the average particle size is less than 50 microns.

6. The process of claim 5, wherein the plurality of green pellets have an average pellet size of between 150 to 1000 microns.

7. The process of claim 6, wherein the plurality of green pellets have a water content of between 15 to 25 wt %.

8. The process of claim 7, further including drying the plurality of green pellets and reducing the water content to between 0.5 to 1 wt %.

9. The process of claim 8, further including preheating the plurality of green pellets before feeding the plurality of green pellets into the flame drop tower.

10. The process of claim 9, wherein the plurality of green pellets are preheated to a temperature of between 100 to 400° C.

11. The process of claim 10, further including using waste heat from the flame drop tower to assist at least one of drying the plurality of green pellets and preheating the plurality of green pellets.

12. The process of claim 1, wherein the hot zone has a temperature between 1300 to 1500° C.

13. The process of claim 12, wherein the plurality of green pellets have a residence time of between 0.5 to 1.5 seconds in the hot zone.

14. The process of claim 13, wherein the plurality of green pellets that have melted in the hot zone solidify within a residence time of between 1.0 to 3.0 seconds between the hot zone and the collection basin.

15. The process of claim 14, wherein the solidified spheres are vitrified glass spheres having a size range between 150 to 1700 microns.

16. The process of claim 15, further including devitrification of the vitrified glass spheres.

17. The process of claim 16, wherein devitrification of the vitrified glass spheres includes heating the spheres to a temperature of between 700 to 1050° C., inclusive.

18. The process of claim 17, wherein the devitrified glass spheres have a fracture toughness of at least 25% greater than the vitrified glass spheres.

19. The process of claim 17, wherein the devitrified glass spheres have a Vickers indentation fracture resistance greater than 1.2 MPa·$\sqrt{m}$.

20. The process of claim 17, wherein the devitrified glass spheres have a Vickers indentation fracture resistance greater than 1.5 MPa·$\sqrt{m}$.

* * * * *